United States Patent [19]

Ito et al.

[11] Patent Number: 5,907,007
[45] Date of Patent: May 25, 1999

[54] SOLDERING FLUX

[75] Inventors: Naoki Ito, Nagoya; Masanori Takemoto, Anjou; Masami Aihara, Kakogawa; Tatsushi Onishi, Kako-gun, all of Japan

[73] Assignees: Denso Corporation, Kariya; Harima Chemicals, Inc., Kakogawa, both of Japan

[21] Appl. No.: 08/820,005

[22] Filed: Mar. 18, 1997

[30] Foreign Application Priority Data

Mar. 19, 1996 [JP] Japan ................................ 8-063164

[51] Int. Cl.$^6$ .................................................. B23K 35/363
[52] U.S. Cl. ........................ 524/239; 524/285; 524/292; 524/296; 524/321; 524/322; 148/23
[58] Field of Search .............................. 148/23; 524/321, 524/322, 239, 285, 292, 296

[56] References Cited

U.S. PATENT DOCUMENTS

| | | | |
|---|---|---|---|
| 3,791,027 | 2/1974 | Angelo et al. | 148/23 |
| 3,842,023 | 10/1974 | Anagnostou et al. | |
| 4,419,146 | 12/1983 | Roberts | 148/23 |
| 5,116,432 | 5/1992 | Kerner | 148/23 |
| 5,167,729 | 12/1992 | Takemoto et al. | 148/23 |

FOREIGN PATENT DOCUMENTS

| | | |
|---|---|---|
| 49-11301 | 3/1974 | Japan . |
| 190996 | 7/1992 | Japan . |
| 5-228689 | 9/1993 | Japan . |
| 1338994 | 9/1987 | U.S.S.R. . |
| 05228 | 4/1992 | WIPO . |

OTHER PUBLICATIONS

Hawley's Condensed Chemical Dictionary 13th Edition p. 18.

*Primary Examiner*—David Buttner
*Attorney, Agent, or Firm*—Pillsbury Madison & Sutro LLP

[57] ABSTRACT

A non-washing soldering flux which is capable of minimizing corrosion and insulation defects due to precipitation of metal salts and cracking of the base resin is disclosed. The flux includes an activator including a dibasic acid with a molecular weight of 250 or less, and a monobasic acid with a molecular weight of from 150 to 300 and/or a dibasic acid with a molecular weight of from 300 to 600. The dibasic acid of molecular weight 250 or less in the flux exhibits sufficient activity, thus ensuring satisfactory solderability. The monobasic acid of molecular weight from 150 to 300 and the dibasic acid of molecular weight from 300 to 600 which are combined therewith promote the activity while also uniformly dispersing the metal salt of the low molecular weight dibasic acid in the flux residue, allowing it to be enveloped by the hydrophobic base resin. For greater cracking resistance, the flux includes at least an acrylic resin of molecular weight 10,000 or less and an activator.

4 Claims, No Drawings

SOLDERING FLUX

BACKGROUND OF THE INVENTION

1. Field of the Invention

The present invention relates to a soldering flux used, for example, for soldering connections of circuit parts and the like to circuit boards provided with suitable metal wiring.

2. Description of the Related Art

Soldering of circuit parts on metal wiring sections of circuit boards requires subsequent removal of solder and metal oxides, etc. on the surface of the boards and prevention of reoxidation of the metal surface during soldering, while it is also necessary to lower the surface tension of the solder in order to accomplish satisfactory soldering. Soldering flux is used for this purpose.

A flux used for this purpose has conventionally incorporated inorganic acids as activators and particularly dibasic acids with relatively low molecular weights (for example molecular weights of 250 and less) have been employed as activators. However, when a synthetic resin is used as the base material, such as in recently used non-washing flux which requires no washing, or even when a rosin is used, when the proportion of rosin is low as with low-residue flux, the organic acid metal salt fails to totally dissolve in the resin and precipitates out in beads on the board. The organic acid in this precipitate is readily decomposed by moisture, becoming a cause of corrosion and insulation defects.

As a result, such non-washing flux is used with a minimal content of the dibasic acid or by replacing the dibasic acid with a monobasic acid. However, although such measures result in improvement from the standpoint of precipitation of the metal salt, the activating power is reduced, and this reduction in the activating power results in many soldering defects.

Conventional fluxes have employed rosins as the base resins However, when a residue remains on the board as in the case of non-washing flux, consequent results are cracking at low temperatures and peeling of the residue by vibrations, etc., thus leading to poor reliability with increased moisture penetration. Therefore, a synthetic resin is sometimes used either alone or in combination with the rosin in the non-washing flux. Yet, although the synthetic resin gives an improved quality to the residue film compared to the rosin alone, cracking and peeling still occur upon repeated temperature cycle tests and impact tests.

DESCRIPTION OF THE INVENTION

The present invention has been accomplished in the light of these circumstances, and its object is to provide a soldering flux which is capable of reliably minimizing corrosion and insulation defects, due to precipitation of the metal salt, and cracking of the base resin.

The soldering flux according to the first invention comprises an activator comprising a dibasic acid with a molecular weight of 250 or less, and at least one of a monobasic acid with a molecular weight of from 150 to 300 and also a dibasic acid with a molecular weight of from 300 to 600.

The dibasic acid with a molecular weight of 250 or less may be selected from among succinic acid, adipic acid, sebacic acid, phthalic acid, hexahydrophthalic acid, aminosuccinic acid and diphenic acid, and the monobasic acid with a molecular weight of from 150 to 300 may be selected from among decanoic acid, stearic acid, oleic acid, anisic acid, benzoylbenzoic acid and cuminic acid. The dibasic acid with a molecular weight of from 300 to 600 may be selected, for example, from among SL-20 (product of Okamura Oils), esterification product of diethylene glycol and succinic anhydride, and dimers of unsaturated fatty acids.

When this type of flux is used, the dibasic acid with a low-molecular weight of 250 or less exhibits sufficient activity, thus ensuring satisfactory solderability. In addition, the monobasic acid with a molecular weight of from 150 to 300 and the dibasic acid with a molecular weight of from 300 to 600 further promote the activity, while also uniformly dispersing the metal salt of the low molecular weight dibasic acid in the flux residue, allowing it to be enveloped by the hydrophobic base resin. This not only prevents moisture-induced decomposition and ionization of the organic acid metal salt in the residue, but also prevents ionization of the residual organic acid, thus providing highly reliable flux for minimal electrical insulation defects and corrosion, and thus satisfactory solderability.

The soldering flux according to the second invention comprises at least a thermoplastic acrylic resin with an average molecular weight of 10,000 or less, and an activator. The resin selected here may preferably be one with a molecular weight of 10,000 or less and excellent crack resistance and peeling resistance.

To better promote the activity, the acid value of the thermoplastic acrylic resin may preferably be at least 50, and since softness is necessary during soldering the softening point may preferably be 230° C. or below. For this reason, it is preferred to use a monomer with a polymerizable unsaturated group, for example (meth)acrylic acid or an ester thereof, crotonic acid, itaconic acid or maleic acid (or anhydride) or an ester thereof, (meth)acrylonitrile, (meth) acrylamide, vinyl chloride, vinyl acetate, etc., with a peroxide or other type of catalyst, and to accomplish the polymerization by a radical polymerization process such as bulk polymerization, liquid polymerization, suspension polymerization or emulsion polymerization.

The activator used is preferably a hydrogen halide salt of ethylamine, propylamine, diethylamine, triethylamine, ethylenediamine or aniline, or an organic carboxylic acid such as lactic acid, citric acid, stearic acid, adipic acid or diphenylacetic acid.

Also, according to the second invention, a portion of the resin used above may be a commonly used rosin and/or a derivative thereof. The rosin and/or its derivative may be a common gum, tall oil or wood rosin, with derivatives thereof including heat treated resins, polymerized rosins, hydrogenated rosins, formylated rosins, rosin esters, rosin-modified maleic acid resins, rosin-modified phenolic resins and rosin-modified alkyd resins, and it is used as a binder for uniform application of the activator to the metal.

When the flux of the invention is used in liquid form, a solvent may also be added thereto. The solvent is preferably a polar solvent capable of dissolving the acrylic resin, activator and rosin components, and an alcoholic solvent is usually used, among which isopropyl alcohol is particularly preferred from the standpoint of volatility and dissolution of the activator.

The acrylic resin with a molecular weight of 10,000 or less is preferably used, for the invention, in an amount of 0.5–80 wt % based on the total flux. At less than 0.5 wt % it becomes difficult to achieve uniform application of the activator to the metal during soldering, which thus results in soldering defects. The film properties after soldering are also impaired, thus lowering the high temperature resistance. Conversely, at greater than 80 wt % the viscosity of the flux itself is increased, leading to the problem of poorer solderability caused by thickening of the flux film.

The activator is preferably used for the invention in an amount of 0.1–30 wt % based on the total flux. At less than 0.1 wt % there is a lack of activity, and poor solderability. At greater than 30 wt % the film properties of the flux are impaired and strong hydrophilicity sometimes results, thus leading to corrosion and insulation defects. When a solvent is added to allow use of the flux of the invention in liquid form, the solvent is preferably used at 20–99 wt % based on the total flux. With the solvent present at less than 20 wt % the viscosity of the flux is increased, resulting in poor coatability of the flux. When present at greater than 99 wt % the effective components (acrylic resin, etc.) of the flux become sparse, resulting in poor solderability.

The third invention is soldering flux comprising at least a thermoplastic acrylic resin with an average molecular weight of 10,000 or less, a monomer containing a radically polymerizable unsaturated double bond, and an activator.

The acrylic resin selected for use according to the invention may preferably exhibit excellent crack resistance and peel resistance, and have a molecular weight of 10,000 or less. To better promote the activity, the acid value of the acrylic resin may preferably be at least 50, and since softness is necessary during soldering the softening point may preferably be 230° C. or below. For this reason, it is preferred to use a monomer with a polymerizable unsaturated group, for example (meth)acrylic acid or an ester thereof, crotonic acid, itaconic acid or maleic acid (or anhydride) or an ester thereof, (meth)acrylonitrile, (meth)acrylamide, vinyl chloride, vinyl acetate, etc., which has been polymerized by peroxide radical polymerization.

The monomer containing a radically polymerizable unsaturated double bond to be used according to the invention may preferably be one of which at least 50 wt % is lost by volatilization upon heating during soldering, because too much thereof remaining in the residue after soldering can result in heat-induced softening or fluidity of the residue, thus inhibiting its durability. Examples include (meth) acrylic acid and esters thereof, crotonic acid, itaconic acid and maleic acid (or anhydride) and esters thereof, (meth) acrylonitrile, (meth)acrylamide, vinyl chloride, vinyl acetate, etc., and (meth)acrylic acid and esters thereof are particularly preferred from the standpoint of suitable reactivity with halogen activators during the heating of soldering. The activator used is preferably a hydrogen halide salt of ethylamine, propylamine, diethylamine, triethylamine, ethylenediamine or aniline, or an organic carboxylic acid such as lactic acid, citric acid, stearic acid, adipic acid or diphenylacetic acid.

Also, according to this invention a portion of the above-mentioned acrylic resin may be a commonly used rosin and/or a derivative thereof. The rosin and/or its derivative may be a common gum, tall oil or wood rosin, with derivatives thereof including heat treated resins, polymerized rosins, hydrogenated rosins, formulated rosins, rosin esters, rosin-modified maleic acid resins, rosin-modified phenolic resins and rosin-modified alkyd resins, and it is used as a binder for uniform application of the activator to the metal.

When the flux of the invention is used in liquid form, an organic solvent may also be mixed therewith. The organic solvent may be an alcoholic solvent such as ethyl alcohol, isopropyl alcohol, ethyl cellosolve or butyl carbitol, an ester solvent such as ethyl acetate or butyl acetate, a hydrocarbon solvent such as toluene or terpene oil, or a ketone solvent such as acetone or methyl ethyl ketone, among which isopropyl alcohol is particularly preferred from the standpoint of volatility and dissolution of the activator.

The acrylic resin with a molecular weight of 10,000 or less is preferably used in an amount of 0.5–80 wt % based on the total flux. At less than 0.5 wt % it becomes difficult to achieve uniform application of the activator to the metal during soldering, which thus results in soldering defects. The film properties after soldering are also impaired, thus lowering the high temperature resistance. Conversely, at greater than 80 wt % the viscosity of the flux itself is increased, leading to the problem of poorer solderability caused by thickening of the flux film.

The monomer is preferably used in an amount of at least 1 wt % based on the total flux, because at less than 1 wt % sufficient inactivation of the activator cannot be achieved, making it impossible to ensure sufficient corrosion resistance and insulation properties. The activator of the invention is preferably used in an amount of 0.1–30 wt % based on the total flux. At less than 0.1 wt % there is a lack of activating power, and poor solderability. At greater than 30 wt % the film properties of the flux are impaired and strong hydrophilicity sometimes results, thus leading to corrosion and insulation defects.

When a solvent is added for use of the flux of the invention in liquid form, the solvent is preferably used at 20–99 wt % based on the total flux. With the solvent present at less than 20 wt % the viscosity of the flux is increased, resulting in poor coatability of the flux. When present at greater than 99 wt % the effective components (acrylic resin, etc.) of the flux become sparse, resulting in poor solderability.

In other words, since the flux according to the second invention contains an acrylic resin with a molecular weight of 10,000 or less and with excellent flexibility, no cracking or peeling is seen in the residual film of the flux even in environments subject to vibration such as automobile engine compartments, etc. during winter or in cold regions, or with frequent heat cycles from low temperature to high temperature. As a result, the residual activator in the residue does not undergo ionization due to penetrating moisture, and thus electrical insulation defects and corrosion may be prevented.

Also, in cases where a rosin and/or derivative thereof is used as a portion of the acrylic resin, it mixes with the acrylic resin which is highly flexible after soldering, to form a crack-resistant, peel-resistant flux film and prevent release of active ions of the activator in the residue, thus ensuring high reliability.

Furthermore, since the flux of the third invention employs a highly flexible acrylic resin with a molecular weight of 10,000 or less instead of a low-temperature cracking rosin, there is no cracking or peeling of the residue film of the flux even in environments subject to vibration at low temperature after soldering, and thus both electrical insulation and corrosion resistance may be maintained.

Although a portion of the acrylic resin is replaced with a rosin and/or a derivative thereof, the brittleness of the rosin is improved due to mixture between the acrylic resin and the rosin and/or its derivative, and thus reliability is ensured in environments subject to impact or heat cycles. In addition, heating of the compound with a radical polymerizable unsaturated group by the heat of soldering, which causes reaction with the active ions in the flux residue resulting in loss of their activity, allows further improvement in the electrical insulation and corrosion resistance.

The present invention will further be illustrated by way of the following examples.

EXAMPLE 1

Sebacic acid was used as the dibasic acid of molecular weight 250 or less at 1.0 wt % and stearic acid was used as the monobasic acid of molecular weight 150 to 300 at 2.5 wt %. An acrylic resin, specifically an acrylic resin with an acid value of 100 and an average molecular weight of 4500 was used as the base resin at 6.2 wt % based on the total flux. Also, aniline hydrobromide was used as the halogen activator at 0.3 wt %, and isopropyl alcohol was used as the solvent at 90 wt %.

These components were thoroughly dissolved and dispersed to uniformity to obtain a flux for this example, and the flux was subjected to various tests. The parameters tested were electrical insulation, corrosion, expansion ratio and solderability. The insulation, corrosion and expansion ratio were determined according to JIS-Z-3197. The solderability was determined by visual observation of any defects produced after soldering glass epoxy boards with a jet soldering apparatus. The results are shown in Table 1.

EXAMPLE 2

Adipic acid was used as the dibasic acid of molecular weight 250 or less at 0.8 wt %, SL-20 was used as the dibasic acid of molecular weight 300 to 600 at 2.7 wt % and isopropyl alcohol was used as the solvent at 86.5 wt %, with the same other components as Example 1, and the components were thoroughly dissolved and dispersed to uniformity to obtain a flux for this example. The results of testing this flux in the same manner as Example 1 are shown in Table 1.

EXAMPLE 3

Adipic acid was used as the dibasic acid of molecular weight 250 or less at 0.8 wt %, cuminic acid was used as the monobasic acid of molecular weight 150 to 300 at 1.5 wt %, an esterification reaction product of diethyl glycol and succinic anhydride as the dibasic acid of molecular weight 300 to 600 was used at 1.2 wt %, and isopropyl alcohol was used as the solvent at 87.5 wt %. The other components were the same as in Example 1, and the components were thoroughly dissolved and dispersed to uniformity to obtain a flux for this example. Testing was conducted in the same manner as Example 1. and the results are shown in Table 1.

EXAMPLE 4

Phthalic acid was used as the dibasic acid of molecular weight 250 or less at 0.5 wt %, cuminic acid was used as the monobasic acid of molecular weight 150 to 300 at 1.5 wt %, and an esterification product of diethyl glycol and succinic anhydride as the dibasic acid of molecular weight 300 to 600 was used at 0.4 wt %. A polymerized rosin was used as the base resin at 3.3 wt % based on the total flux, and aniline hydrobromide was used as the halogen activator at 0.3 wt %. Isopropyl alcohol was used as the solvent at 95 wt %.

The components were thoroughly dissolved and dispersed to uniformity to obtain a flux for this example. The results of testing this flux in the same manner as Example 1 are shown in Table 1.

TABLE 1

|  | Examples | | | | Comp. Exs. | |
| --- | --- | --- | --- | --- | --- | --- |
|  | 1 | 2 | 3 | 4 | 1 | 2 |
| Flux Composition (wt %) | | | | | | |
| Acrylic resin | 6.2 | 6.2 | 6.2 | — | — | 8.9 |
| Polymerization rosin | — | — | — | 3.3 | 4.2 | — |
| Sebacic acid | 1.0 | 1.0 | — | — | — | — |
| Adipic acid | — | 0.8 | 0.8 | — | — | 0.8 |
| Phthalic acid | — | — | — | 0.5 | 0.5 | — |
| Stearic acid | 2.5 | 2.5 | 2.5 | — | — | — |
| Cuminic acid | — | — | 1.5 | 0.5 | — | — |
| SL-20 | — | 2.7 | — | — | — | — |
| Diethylene glycol, succinic anhydride reaction product | — | — | 1.2 | 0.4 | — | — |
| Aniline hydrobromide | 0.3 | 0.3 | 0.3 | 0.3 | 0.3 | 0.3 |
| Isopropyl alcohol | 90.0 | 86.5 | 87.5 | 95.0 | 95.0 | 90.0 |
| Test results | | | | | | |
| Insulation resistance ($\Omega$) Initial | $8 \times 10^{12}$ | $5 \times 10^{12}$ | $6 \times 10^{12}$ | $6 \times 10^{12}$ | $1 \times 10^{12}$ | $3 \times 10^{12}$ |
| 500 hr | $2 \times 10^{12}$ | $1 \times 10^{12}$ | $5 \times 10^{12}$ | $2 \times 10^{12}$ | $4 \times 10^{9}$ | $7 \times 10^{9}$ |
| 1000 hr | $2 \times 10^{12}$ | $2 \times 10^{12}$ | $3 \times 10^{12}$ | $1 \times 10^{12}$ | $3 \times 10^{8}$ | $1 \times 10^{9}$ |
| Corrosion 500 hr | none | none | none | none | pits | pits |
| 1000 hr | none | none | none | none | corrosion | corrosion |
| Expansion ratio (%) | 94 | 93 | 93 | 94 | 91 | 90 |
| Solderability (% defects) | $\leq 1$ | $\leq 1$ | $\leq 1$ | $\leq 1$ | 2–3 | 2–3 |
| Residue precipitate | absent | absent | absent | absent | present | present |

Table 1 shows the results for Examples 1 to 4 together with the results for Comparative Examples 1 and 2, which will now be described.

COMPARATIVE EXAMPLE 1

Using 4.2 wt % of a polymerization rosin, 0.5 wt % of phthalic acid and 0.3 wt % of aniline hydrobromide as activators, and 95 wt % of isopropyl alcohol as the solvents the components were thoroughly dissolved and dispersed to uniformity to obtain a flux. The results of testing this Comparative Example 1 in the same manner as Example 1 are shown in Table 1.

COMPARATIVE EXAMPLE 2

The base resin used was the acrylic resin with an acid value of 100 and an average molecular weight of 4500 used in Example 1, at 8.9 wt % to the total flux. Adipic acid was used at 0.8 wt % and aniline hydrobromide at 0.3 wt % as activators, and isopropyl alcohol was used as the solvent at 90 wt %. These components were thoroughly dissolved and dispersed to uniformity to obtain a flux. The test results are also shown in Table 1.

As Table 1 clearly shows, the flux of the examples had no precipitation of organic acid metal salts, and thus high reliability, unlike the flux of the comparative examples. In addition, since the flux of the examples contained organic acids with a metal salt dispersing effect in addition to the low molecular weight dibasic acid and halogen activator, even with flux having a low solid portion as in Example 4 it was possible to achieve a satisfactory expansion ratio and solderability.

Examples 5 to 8 will now be described.

molecular weight of about 7000 as the acrylic resin in Example 6 and 8.7 wt % of an acrylic resin with an acid value of 50 and an average molecular weight of about 4500 in Example 7. The other components are listed in detail in Table 2.

EXAMPLE 8

The performance of the flux in paste form was evaluated. For the composition there was used 75 wt % of the acrylic resin listed in Table 2 with an acid value of 65 and an average molecular weight of 5500, without the disproportionated rosin. Butyl carbitol was used as the solvent at 23.7 wt %, with the same active components as in Example 5.

TABLE 2

|  | Examples | | | | Comp. Exs. |
| --- | --- | --- | --- | --- | --- |
|  | 5 | 6 | 7 | 8 | 3 |
| Flux Composition (wt %) | | | | | |
| Acrylic resin | 5.7 | 5.7 | 8.7 | 75.0 | — |
| Disproportionation rosin | 3.0 | 3.0 | — | — | 8.7 |
| Adipic acid | 1.0 | 1.0 | 1.0 | 1.0 | 1.0 |
| Aniline hydrobromide | 0.3 | 0.3 | 0.3 | 0.3 | 0.3 |
| Isopropyl alcohol | 90.0 | 90.0 | 90.0 | — | 90.0 |
| Butyl carbitol | — | — | — | 23.7 | — |
| Average mol. wt. of acrylic resin | 5000 | 7000 | 4500 | 5500 | |
| Acid value of acrylic resin | 100 | 80 | 50 | 65 | — |
| Test results | | | | | |
| Expansion ratio (%) | 94 | 93 | 92 | 93 | 93 |
| Solderability (% defects) | $\leq 1$ | $\leq 1$ | $\leq 1$ | $\leq 1$ | $\leq 1$ |
| Insulation resistance after temperature cycle ($\Omega$) Initial | $5 \times 10^{12}$ | $8 \times 10^{12}$ | $6 \times 10^{12}$ | $4 \times 10^{12}$ | $5 \times 10^{12}$ |
| 500 hr | $2 \times 10^{12}$ | $3 \times 10^{12}$ | $3 \times 10^{12}$ | $2 \times 10^{12}$ | $6 \times 10^{9}$ |
| 1000 hr | $2 \times 10^{12}$ | $2 \times 10^{12}$ | $3 \times 10^{12}$ | $2 \times 10^{12}$ | $5 \times 10^{8}$ |
| Corrosion after temperature cycle 500 hr | none | none | none | none | pits |
| 1000 hr | none | none | none | none | corrosion |

EXAMPLE 5

An acrylic resin with an average molecular weight of about 5000 and an acid value of 100 was used at 5.7 wt % to the total flux. A disproportionated rosin was used at 3.0 wt %, adipic acid at 1.0 wt % and aniline hydrobromide at 0.3 wt % as activators, and isopropyl alcohol was used as the solvent at 90 wt %. The components were thoroughly dissolved and dispersed to uniformity to obtain a flux, which was then subjected to each of the aforementioned tests.

Here, the tests for the expansion ratio, insulation and corrosion were carried out as in Example 1, while the solderability was determined by visual observation of any defects produced after soldering epoxy boards with a jet soldering apparatus, and conditions for the low temperature test were 1000 cycles from −30° C.×30 minutes to 85° C. for 30 minutes. The results are shown in Table 2.

EXAMPLES 6 AND 7

The procedure in Example 5 was repeated using 5.7 wt % of an acrylic resin with an acid value of 80 and an average

COMPARATIVE EXAMPLE 3

Using 8.7 wt % of a disproportioned rosin, 1.0 wt % of adipic acid and 0.3 wt % of aniline hydrobromide as activators and 90 wt % of isopropyl alcohol as the solvent, the components were thoroughly dissolved and dispersed to uniformity to obtain a flux. The same tests were conducted as in Example 5.

As clearly shown in Table 2, the flux of Example 5 had superior insulation resistance and corrosion resistance compared to conventional flux even after temperature cycles.

For Examples 6 and 7, a rosin-based flux component and a soft acrylic resin were compatibilized allowing their uniform application, to give flux which produced few soldering defects and was resistant to cracking with low temperature and vibrations. Thus, they are very useful as soldering fluxes and, as a result of being of an unwashed type, a reduction in cost was also realized.

EXAMPLE 9

An acrylic resin with an average molecular weight of under 10,000, specifically an acrylic resin with an acid value of 120 and an average molecular weight of 6500 was used at 8.7 wt % based on the total flux. Adipic acid was used at 1.0 wt % and ethylamine hydrochloride at 0.3 wt % as activators. In addition, the methacrylic acid ester 2-ethylhexyl methacrylate was used as a monomer with a radically polymerizable unsaturated group at 4.5 wt %, and isopropyl alcohol was used as the solvent at 85.5 wt %. The flux obtained in this manner was subjected to the same tests as in Example 5, giving the results shown in Table 3.

EXAMPLE 10

An acrylic resin with an acid value of 60 and an average molecular weight of 8000 was used at 5.7 wt % and a hydrogenated rosin was used at 3.0 wt %, while the other components were the same as in Example 9. The same procedure was followed as in Example 9, and testing gave the results shown in Table 3.

EXAMPLE 11

An acrylic resin with an acid value of 50 and an average molecular weight of 5000 was used at 5.7 wt %, and the monomer used was benzyl methacrylate which is a methacrylic acid ester. The other components were the same as in Example 10, and the same procedure gave flux with the results shown in Table 3.

EXAMPLE 12

The performance of the flux in paste form was evaluated in the same manner as Example 8. For the composition there was used 78.7 wt % of an acrylic resin with an acid value of 60 and an average molecular weight of 6000, butyl carbitol was used as the solvent at 15.5 wt %, and the other components were the same as in Example 9, with which flux was obtained using the same procedure. The same tests were conducted.

TABLE 3

| | | Examples | | | | Comp. Exs. |
|---|---|---|---|---|---|---|
| | | 9 | 10 | 11 | 12 | 4 |
| Flux Composition (wt %) | | | | | | |
| Acrylic resin | | 8.7 | 5.7 | 5.7 | 78.7 | — |
| Hydrogenated rosin | | — | 3.0 | 3.0 | — | 8.7 |
| Adipic acid | | 1.0 | 1.0 | 1.0 | 1.0 | 1.0 |
| Ethylamine hydrochloride | | 0.3 | 0.3 | 0.3 | 0.3 | 0.3 |
| 2-ethylhexyl methacrylate | | 4.5 | 4.5 | — | 4.5 | — |
| Benzyl methacrylate | | — | — | 4.5 | — | — |
| Isopropyl alcohol | | 85.5 | 85.5 | 85.5 | — | 90.0 |
| Butyl carbitol | | — | — | — | 15.5 | |
| Average mol. wt. of acrylic resin | | 6500 | 8000 | 4500 | 6000 | |
| Acid value of acrylic resin | | 120 | 60 | 50 | 60 | — |
| Test results | | | | | | |
| Expansion ratio (%) | | 91 | 92 | 94 | 93 | 93 |
| Solderability (% defects) | | ≦1 | ≦1 | ≦1 | ≦1 | ≦1 |
| Insulation resistance after temperature cycle (Ω) | Initial | $2 \times 10^{13}$ | $3 \times 10^{13}$ | $3 \times 10^{13}$ | $5 \times 10^{13}$ | $4 \times 10^{12}$ |
| | 500 hr | $5 \times 10^{12}$ | $8 \times 10^{12}$ | $6 \times 10^{12}$ | $4 \times 10^{12}$ | $3 \times 10^{9}$ |
| | 1000 hr | $6 \times 10^{12}$ | $6 \times 10^{12}$ | $5 \times 10^{12}$ | $5 \times 10^{12}$ | $5 \times 10^{8}$ |
| Corrosion after temperature cycle | 500 hr | none | none | none | none | pits |
| | 1000 hr | none | none | none | none | corrosion |
| Halogen content of residue (%) | Preheating | 0.89 | 0.90 | 0.90 | 0.90 | 0.89 |
| | Reflow | 0.1> | 0.1> | 0.1> | 0.1> | 0.75 |

COMPARATIVE EXAMPLE 4

Using 8.7 wt % of a hydrogenated rosin, 1.0 wt % of adipic acid and 0.3 wt % of ethylamine hydrochloride as activators and 90 wt % of isopropyl alcohol as the solvents the components were thoroughly dissolved and dispersed to uniformity to obtain a flux. This flux was tested in the same manner as in Example 9.

What is claimed is:

1. A non-washing soldering flux comprising:
   0.5–80 wt % of at least one thermoplastic acrylic resin with an average molecular weight of 10,000 or less; and
   0.1–30 wt % activators, the activators comprising a dibasic acid with a molecular weight of 250 or less and at least one member selected from the group consisting of a monobasic acid with a molecular weight of from 150 to 300 and a dibasic acid with a molecular weight of from 300 to 600.

2. The non-washing soldering flux of claim 1, wherein the dibasic acid with a molecular weight of 250 or less is selected from the group consisting of succinic acid, adipic acid, sebacic acid, phthalic acid, hexahydrophthalic acid, aminosuccinic acid, and diphenic acid.

3. The non-washing soldering flux of claim 1, wherein the monobasic acid with a molecular weight of from 150 to 300 is selected from the group consisting of decanoic acid, stearic acid, oleic acid, anisic acid, benzoylbenzoic acid, and cuminic acid.

4. The non-washing soldering flux of claim 1, wherein the dibasic acid with a molecular weight of from 300 to 600 is selected from the group consisting of an esterification product of diethylene glycol and succinic anhydride, and dimers of unsaturated fatty acids.

* * * * *